United States Patent
Fetcho et al.

[11] Patent Number: 6,079,539
[45] Date of Patent: Jun. 27, 2000

[54] IN-LINE AXLE DISCONNECT ASSEMBLY

[75] Inventors: Michael Robert Fetcho; Mark Charles Barnholt, both of Fort Wayne, Ind.

[73] Assignee: Dana Corporation, Toledo, Ohio

[21] Appl. No.: 09/250,407

[22] Filed: Feb. 16, 1999

[51] Int. Cl.[7] ................................................. F16D 25/061
[52] U.S. Cl. ................ 192/85 V; 192/69.9; 192/85 CA; 192/86
[58] Field of Search ........................... 192/69.9, 86, 85 V, 192/85 CA

[56] References Cited

U.S. PATENT DOCUMENTS

| | | |
|---|---|---|
| 3,910,131 | 10/1975 | Richards .................................... 74/331 |
| 4,341,281 | 7/1982 | Nagy . |
| 4,452,331 | 6/1984 | Lunn et al. . |
| 4,545,456 | 10/1985 | Lake . |
| 4,627,512 | 12/1986 | Clohessy . |
| 4,960,192 | 10/1990 | Kurihara . |
| 5,123,513 | 6/1992 | Petrak . |
| 5,386,898 | 2/1995 | Weilant et al. . |
| 5,566,805 | 10/1996 | Sommer . |
| 5,794,752 | 8/1998 | Baer et al. ......................... 192/85 CA |
| 5,950,785 | 9/1999 | Adachi et al. ....................... 192/69.49 |

*Primary Examiner*—Charles A Marmor
*Assistant Examiner*—Saúl Rodríguez
*Attorney, Agent, or Firm*—Liniak, Berenato, Longarce & White

[57] ABSTRACT

A part time four wheel drive vehicle has an axle disconnect in its auxiliary drive axle. The axle disconnect comprises a vacuum motor and a tubular shift fork that drives a clutch sleeve so that the clutch sleeve translates between a first position where clutch teeth of the clutch sleeve engage clutch teeth of an outer axle shaft and a second position where the clutch teeth disengage. The vacuum motor and shift fork are housed in a modular assembly disposed between the axle and disconnect casing to improve packaging and reduce the size of the connect mechanism while providing better protection of the disconnect assembly from the outside environment.

14 Claims, 8 Drawing Sheets

IN-LINE AXLE DISCONNECT ASSEMBLY

BACKGROUND OF THE INVENTION a) Field of the Invention

This invention relates generally to an axle disconnect assembly for part-time four wheel drive vehicles and more particularly to vacuum-operated axle disconnect systems.

b) Description of Related Art

It is known to provide a part time four wheel drive vehicle that includes an axle disconnect mechanism in a front axle assembly. Such axle disconnect mechanisms include a vacuum motor and a shift fork assembly. The vacuum motor communicates with a vacuum source that is controlled by a two position solenoid valve. The fork shift assembly under control of the vacuum motor controls the axial shifting of a clutch collar between positions corresponding to coupled and uncoupled operating modes.

This conventional system has the drawback of an externally mounted vacuum motor that requires considerable extra space particularly when vehicle suspension travel is taken into account. The use of an externally mounted vacuum motor also necessitates the use of a fork shift assembly which adds to the cost and complexity of the prior art arrangement exemplified by this system.

It is also known that a part time four wheel drive vehicle may include an axle disconnect in the front axle assembly, wherein the axle disconnect is operated by a power shift mechanism. The power shift mechanism includes sealed envelopes in the form of expandable and contractible compartments that shift the axle disconnect into and out of engagement in response to a remote control valve. The sealed envelopes are offset from the axle housing. The shiftable drive gear couples and uncouples inner and outer drive shafts.

This power shift mechanism requires two sealed envelopes and numerous other parts operatively connecting the sealed envelopes with the shiftable drive gear. Moreover, such prior art axle disconnect systems do not provide a modular arrangement necessary for easy of manufacture, assembly and repair. Consequently these prior art arrangements are also complex and expensive to produce particularly when the difficulty of assembly is taken into account.

The need therefore exists for an axle disconnect arrangement and design that is simple in design, compact in construction and economical to package and manufacture.

SUMMARY OF THE INVENTION

This invention provides an axle disconnect that is simple in design, compact in construction and economical to package and manufacture.

A feature of the invention is that the in-line axle disconnect of the invention has a fluid motor and a shiftable clutch sleeve that are coaxially arranged and contained within the disconnect casting to save space. Conventional piston and offset shift fork are replaced by an axial shift fork/piston unitary member.

Another feature of the invention is that the axle disconnect assembly provides enhanced environmental protection via a disconnect mechanism housed within the casting away from the outside environment. The axle disconnect assembly provides a modular arrangement that reduces the time and costs associated with manufacture, assembly and repair.

Another feature of the invention is that the axle disconnect of the invention has a coaxially arranged shiftable clutch sleeve, a tubular shift fork, and fluid motor provided between the axle and the disconnect casing.

Still yet another feature of the invention is that the angular orientation of the unit can be controlled through an interface between the outer lip at the connection between the two vented chambers of the vacuum unit and the disconnect casing so as to align the vents for external access.

The features of the present invention are achieved by the compact vacuum motor, and tubular shift fork assembly which further comprises two vents, one vent leading to each chamber of the vacuum unit. The chambers are separated by a sealed piston member or accordion membrane that attaches to the shift fork/piston piece. The shift fork/piston piece is preferably tubular with tabs or ears interfacing with the shift collar. The shift fork/piston piece can also have a couple of eyebrows or holes formed therein to allow pressure to pass about the shift fork/piston within the inboard chamber. The unit then operates as the pressure changes within each of the two opposing chambers thereby causing the piston to move the shift fork/piston that in turn moves the shift collar.

The mounting flange of the invention is integrally molded as a portion of the shift fork housing to thereby provide a modular assembly. The disconnect housing includes a raised region about a portion of the inside diameter (opposite the mounting flange) to maintain shift fork orientation approximately parallel to the mounting flange and to permit easy assembly/disassembly.

These and other features of the present invention will become more apparent with reference to the following drawings and description associated therewith.

DETAILED DESCRIPTION OF THE PREFERRED EMBODIMENT

Figure 1:
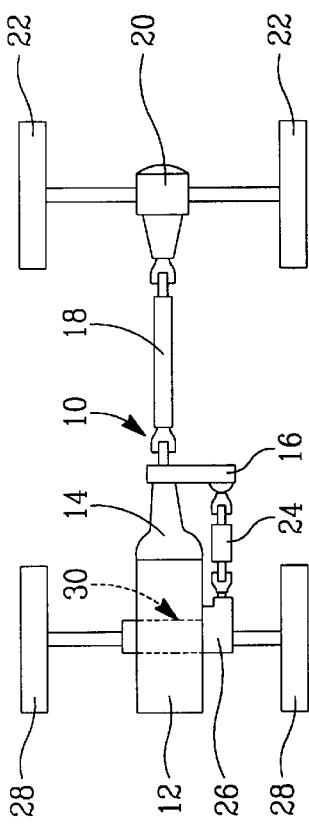
FIG. 1 is a schematic plan view of a part time four wheel drive vehicle.

Referring now to the drawings and more particularly to FIG. 1, there is shown a schematic plan view of a part time four wheel drive vehicle 10 comprising engine 12, transmission 14 and transfer case 16 mounted on a vehicle chassis (not shown). The engine 12 and transmission 14 are conventional and well known components as is the transfer case 16 which typically includes an input shaft, a main output shaft and an auxiliary output shaft. The main output shaft is drive connected to the input shaft by a clutch or the like in the transfer case 16 and customarily offset from the transfer case. The clutch is actuated by a suitable selector mechanism controlled by the vehicle driver. The internal details of the transfer case 16 and details of a selector mechanism are not shown because these are conventional and well known components.

The main output shaft is drivingly connected to a rear drive shaft 18 which in turn is drivingly connected to a rear differential of a rear drive axle 20 that drives rear wheels 22 in a well known manner.

The auxiliary output shaft is drivingly connected to a front drive shaft 24 which in turn is drivingly connected to a front differential of a front drive axle 26 for selectively driving front wheels 28.

This invention relates to an auxiliary drive axle, such as the front drive axle 26 and more particularly to a axle disconnect for such a drive axle that is generally indicated by reference numeral 30 in FIG. 1.

Figure 2:
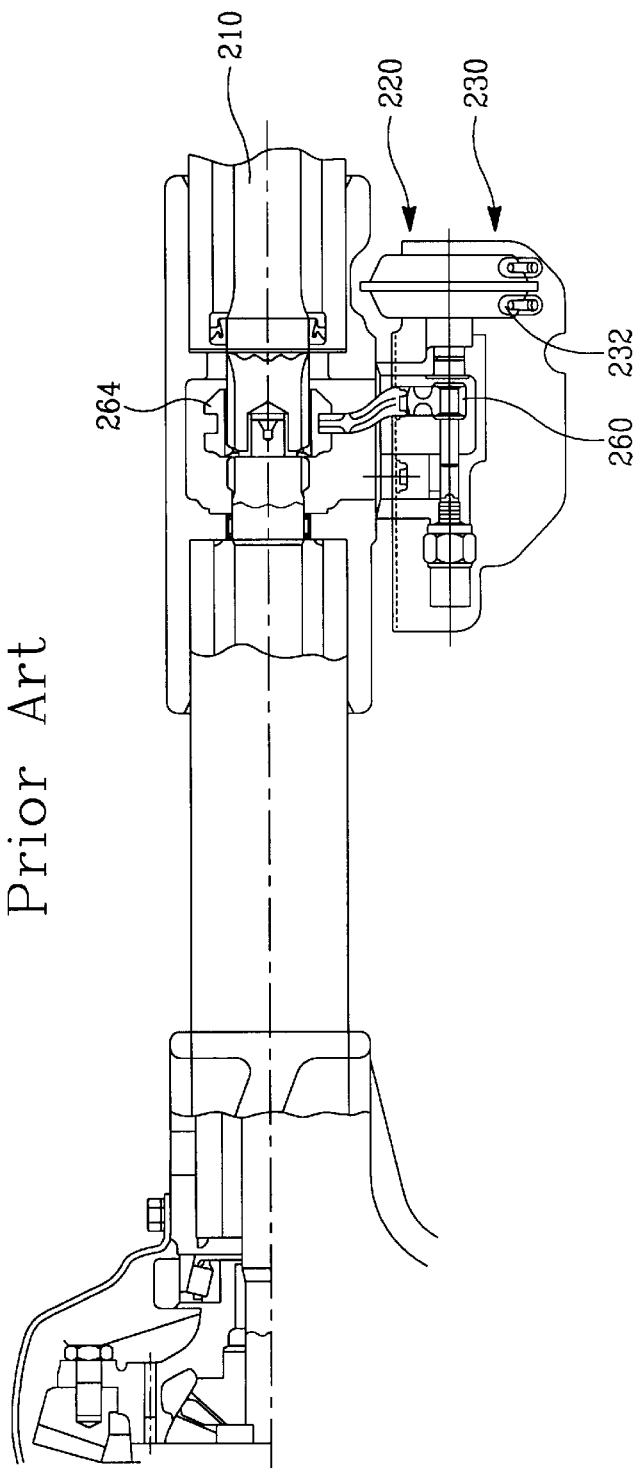
FIG. 2 is a cross sectional view of the conventional axle disconnect assembly.

FIG. 2 shows the conventional axle disconnect assembly that generally includes the front drive axle shaft 210 and control mechanism 220 to selectively control a disconnect operation for the axle shaft 210. The fluid operated servomotor 230 having a vacuum motor 232 and a shift fork assembly 260. The shift fork assembly 260 under control of the vacuum motor 232, controls the axial shifting of the clutch collar 264 between the positions corresponding to the two-wheel and four-wheel drive modes.

Figure 3:
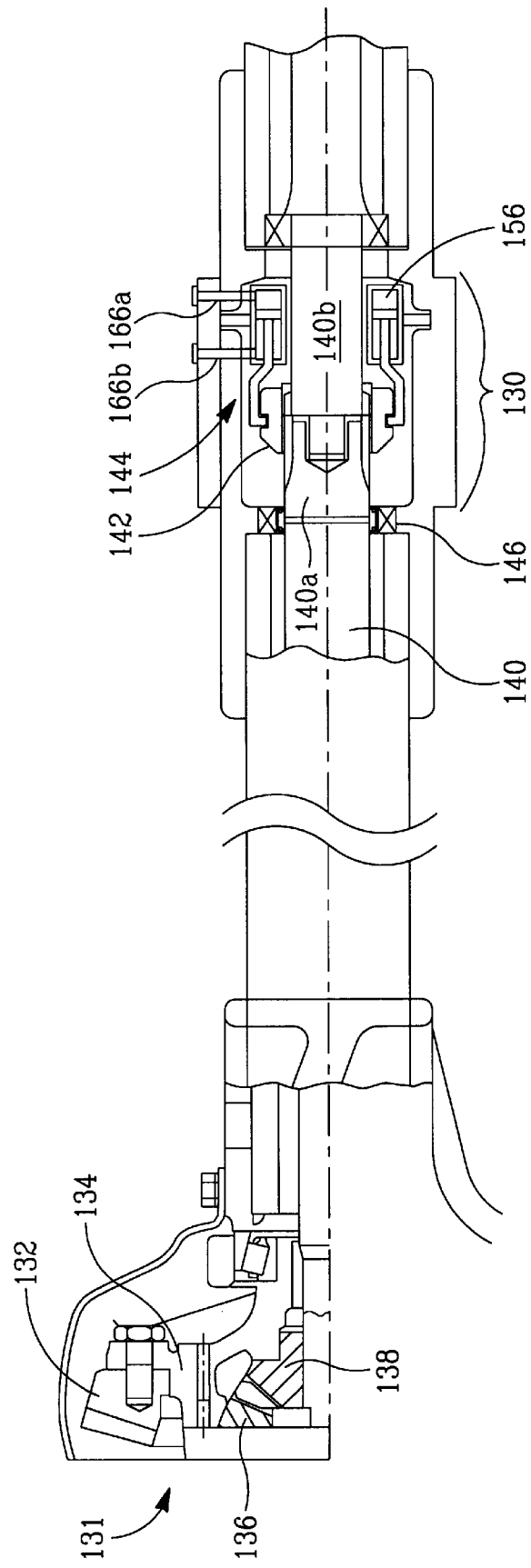
FIG. 3 is fragmentary sectional view of the front drive axle of the vehicle showing the arrangement of the differential gears, ring gears, output shaft, and axle shaft incorporating the in-line axle disconnect assembly of this invention whereby the clutch sleeve is shown connecting the shafts 140a and 140b.

Referring now to FIG. 3, the differential mechanism 131 of the front drive axle is a conventional automotive type bevel gear differential comprising a ring gear 132 that is driven by a pinion gear (not shown) attached to the drive shaft 24 shown in FIG. 1. The ring gear 132 drives a differential case 134 that is rotatably mounted in the axle housing 133. Two pinion gears 136 and two side gears 138 are inside case 134. The pinion gears 136 are journalled or rotatably mounted on a cross pin carried by the case 134 and mesh with each of the side gears 138. The side gears 138 are drivingly connected to the ends of respective drive shafts 140 for driving front wheels 28 (FIG. 1). One drive shaft 140, in this instance, the right drive shaft is split into an inner drive shaft 140a and an outer drive shaft 140b that operate in conjunction with the axle disconnect 130.

The axle disconnect assembly 130 comprises a clutch sleeve 142 and shift means indicated generally at 144 for shifting the clutch sleeve 142 back and forth between a first position and a second position. In the first or engage position the clutch sleeve 142 couples the inner and outer axle shafts 140a and 140b for transmitting torque as shown in FIG. 3. In the second or disengage position, the clutch sleeve 142 is translated to the rightward position shown in FIG. 4 so the inner shaft 140a is decoupled from the outer shaft 140b and neither axle shaft can transmit torque to the other.

The clutch sleeve 142 is formed with inner splines that engage associated splines 141a, 141b formed on the respective ends of the inner and outer axle shafts 140a and 140b.

The inner and outer axle shafts 140a and 140b are coaxially arranged end-to-end. The outer axle shaft 140b has an integral end trunnion that is supported on a cylindrical roller bushing pressed into the hollow end 148 of the outer axle shaft 140b. Conventional cylindrical roller bearings 146 is mounted in the axle housing to rotatably support the inner and outer axle shafts 140a and 140b.

Figure 4:
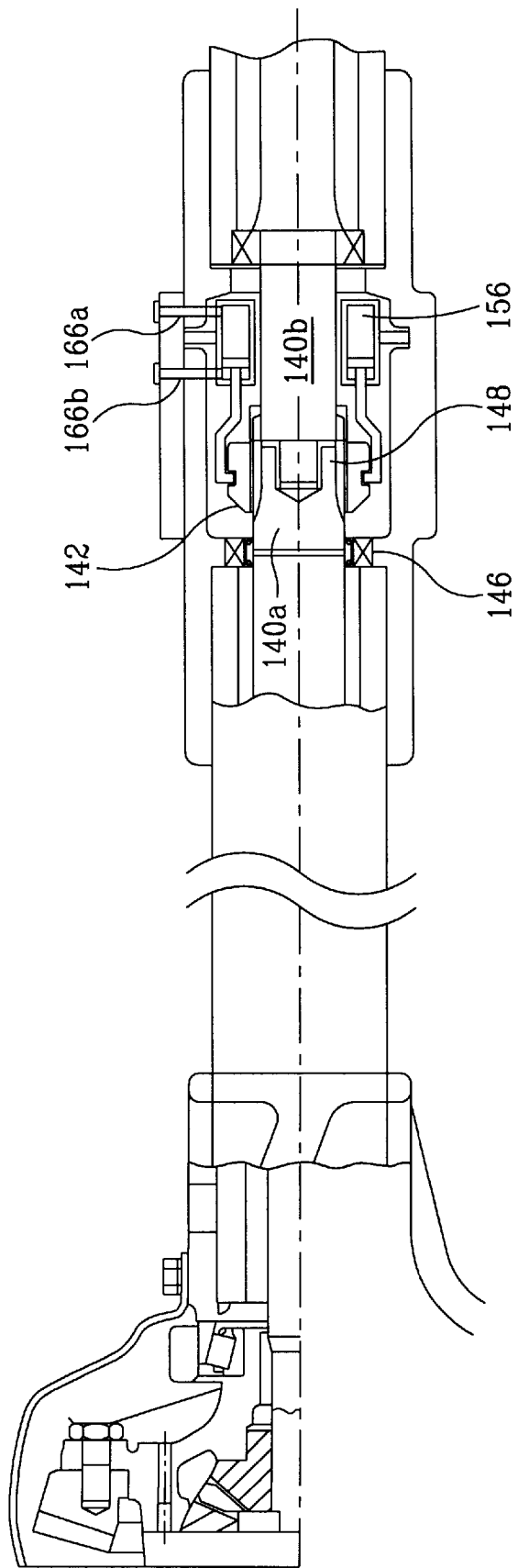
FIG. 4 is fragmentary sectional view as in FIG. 3 where the clutch sleeve is shown in the disconnected state.

The axle disconnect assembly 130 has shift means 144 for shifting the clutch sleeve 142 from the first position to the second position and vice-versa. The shift means 144 comprises the integral annular vacuum unit 156 which is coaxially arranged with respect to the inner axle shaft 140a. The vacuum unit 156 is disposed inside the disconnect casting of the axle-disconnect housing 133 so as to form a motor that drives the shift fork 158 back and forth to thereby shift the clutch sleeve 142 between the first, engaged position (FIG. 3) and the second, disengaged position (FIG. 4). As will be described in further detail below, the vacuum motor 156 is sealed from the remaining interior of the axle housing 133 which is customarily filled with lubricant. More specifically, the shift fork/piston to diaphragm sliding interfaces are sealed by o-rings or oil seals and may use snap rings to limit travel.

The vacuum motor 156 communicates with an external vacuum source via ports 166a, 166b for connecting the vacuum motor 156 to an suitable external vacuum source such as the engine manifold through a control valve (not shown).

The vacuum inputs are received by the unit through two vents, one vent per each of the two chambers 157a, 157b of the vacuum unit. The chambers are separated by a sealed piston or flexible membrane, for example, an accordion-style membrane, that attaches to the shift fork/piston assembly. The shift fork 158 is basically tubular with tabs or ears 158b that interface with the shift sleeve or collar 142. The tubular design of the shift fork allows the unit to clear the axle shaft inside the disconnect casing, thereby reducing the overall size while increasing the reliability and ruggedness of the shift assembly. The shift fork 158 may also be formed with eyebrows or holes to allow pressure to pass about the shift fork 158 within the inboard chamber.

Figure 5:
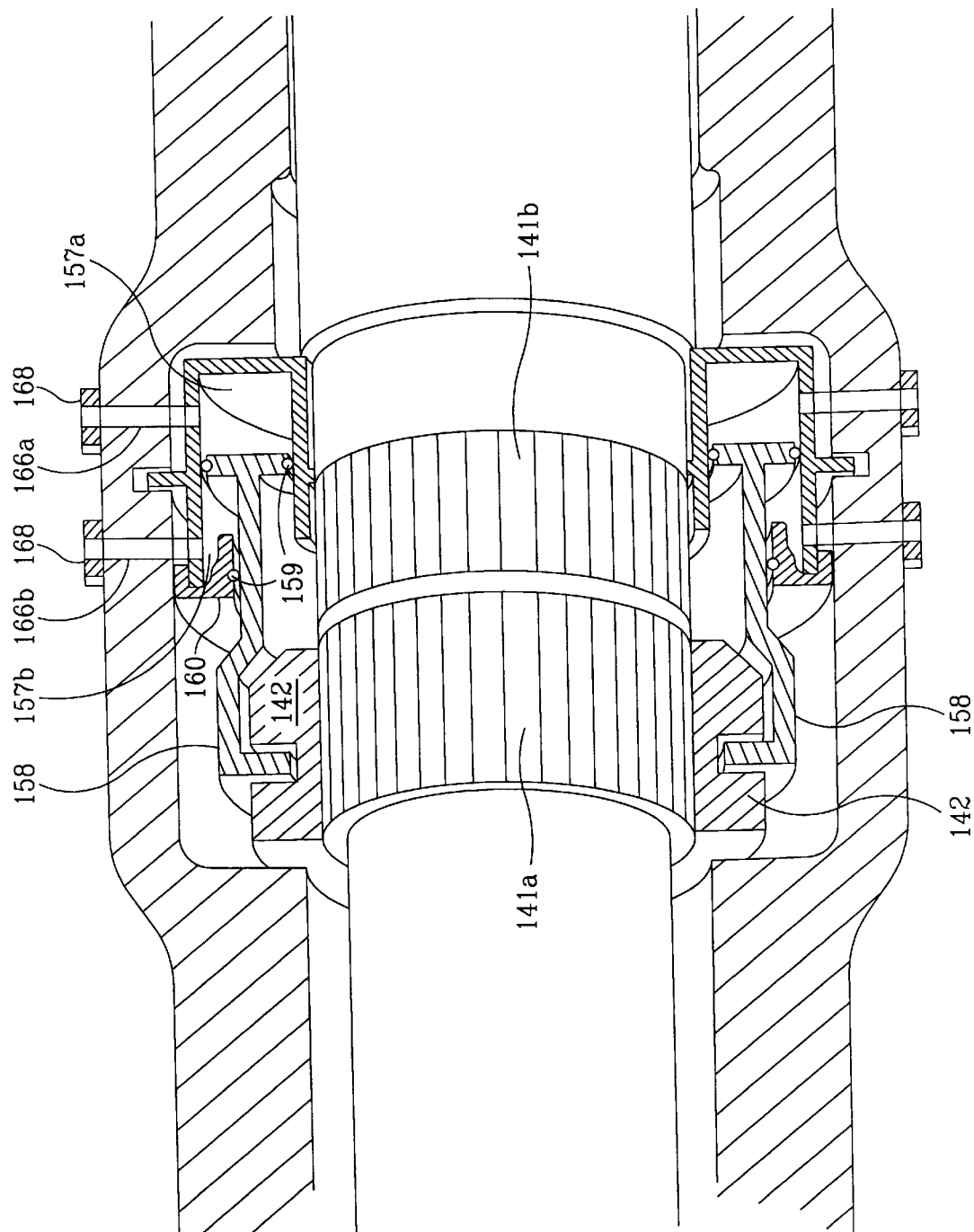
FIG. 5 is an enlarged perspective view of the in-line axle disconnect assembly of FIG. 3 in the disengaged position.

FIG. 5 provides an enlarged sectional view of the axle disconnect assembly according to the preferred embodiment of this invention. As illustrated in FIG. 5, the vacuum unit is disposed inside the axle-disconnect housing 133 so as to form a motor that drives the shift fork 158 back and forth to thereby shift the clutch sleeve 142 between the first, engaged position (FIG. 3) and the second, disengaged position (FIG. 4). The vacuum motor is sealed from the remaining interior of the axle housing 133 which is customarily filled with lubricant. More specifically, the shift fork/piston sliding interfaces are sealed by o-rings or oil seals 159 and snap rings may be used to limit travel.

The vacuum motor 156 comprises an annular main body member 156a defining a U-shaped recess. The shift fork member 158 is formed at one end with a piston 158a slidingly disposed within the U-shaped recess and at its opposite end with shift fork ears 158b for engaging the shift collar 142. A cap member 160 is fittingly secured to the open end of the U-shaped recess to thereby enclose the chamber 157b. Seals 159 are provided to seal the chambers 157a, 157b.

The vacuum motor 156 communicates with an external vacuum source via ports 166a, 166b which have an external fitting 168 for connecting the vacuum motor 156 to an suitable external vacuum source. The vacuum inputs are received by the unit through two vents, one vent per each of the two chambers 157a, 157b of the vacuum unit. The shift fork 158 is basically tubular with tabs or ears 158a, 158b that interface with the shift sleeve or collar 142.

Figure 6:
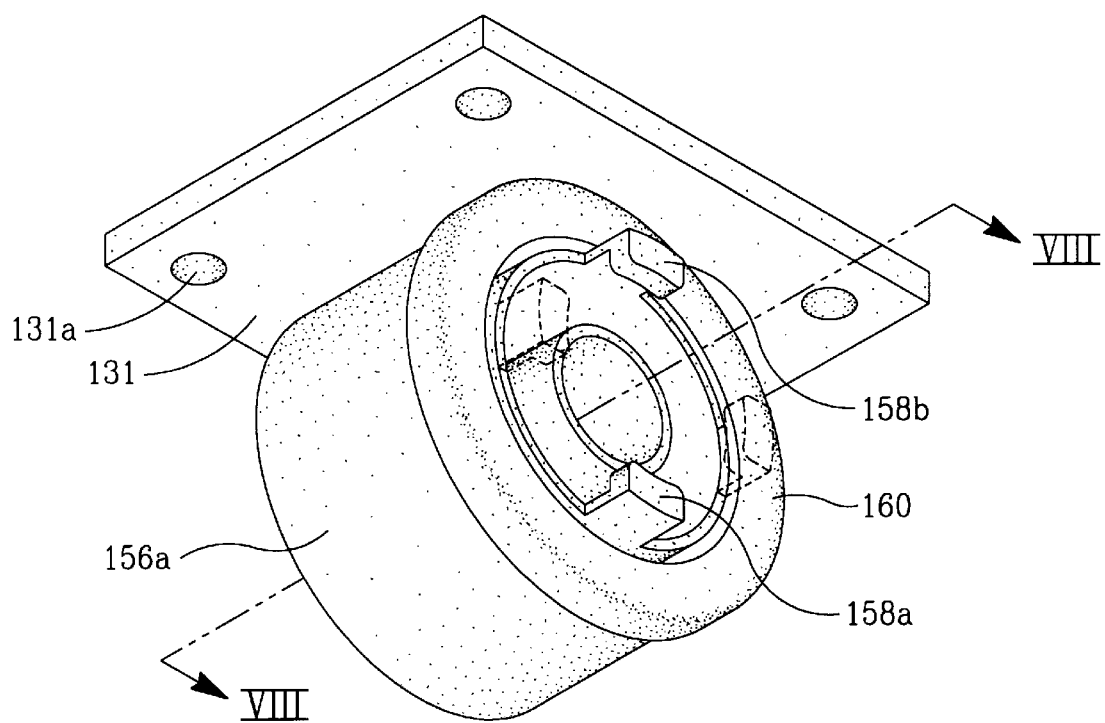
FIG. 6 is a perspective view showing the modular axle disconnect assembly of this invention.

FIG. 6 shows the preferred embodiment of the axle-disconnect assembly 130 of this invention. In the preferred embodiment, the axle disconnect assembly 130 is formed as a modular unit that may be inserted and removed from the axle disconnect housing (see FIG. 7) as a unitary body. Such an arrangement substantially reduces assembly and repair time associated with the axle disconnect assembly 130. The modular axle disconnect assembly of FIG. 6 is simply inserted into the axle disconnected housing 133 with the shift fork ears 158a, 158b oriented in the position shown in dotted lines in FIG. 6. These shift fork ears are slidingly received in the corresponding slot provided on the shift sleeve 142, and the axle-disconnected plate 131 is bolted or otherwise fastened in place onto the axle disconnect housing 133, e.g. via holes 131a.

Figure 7:
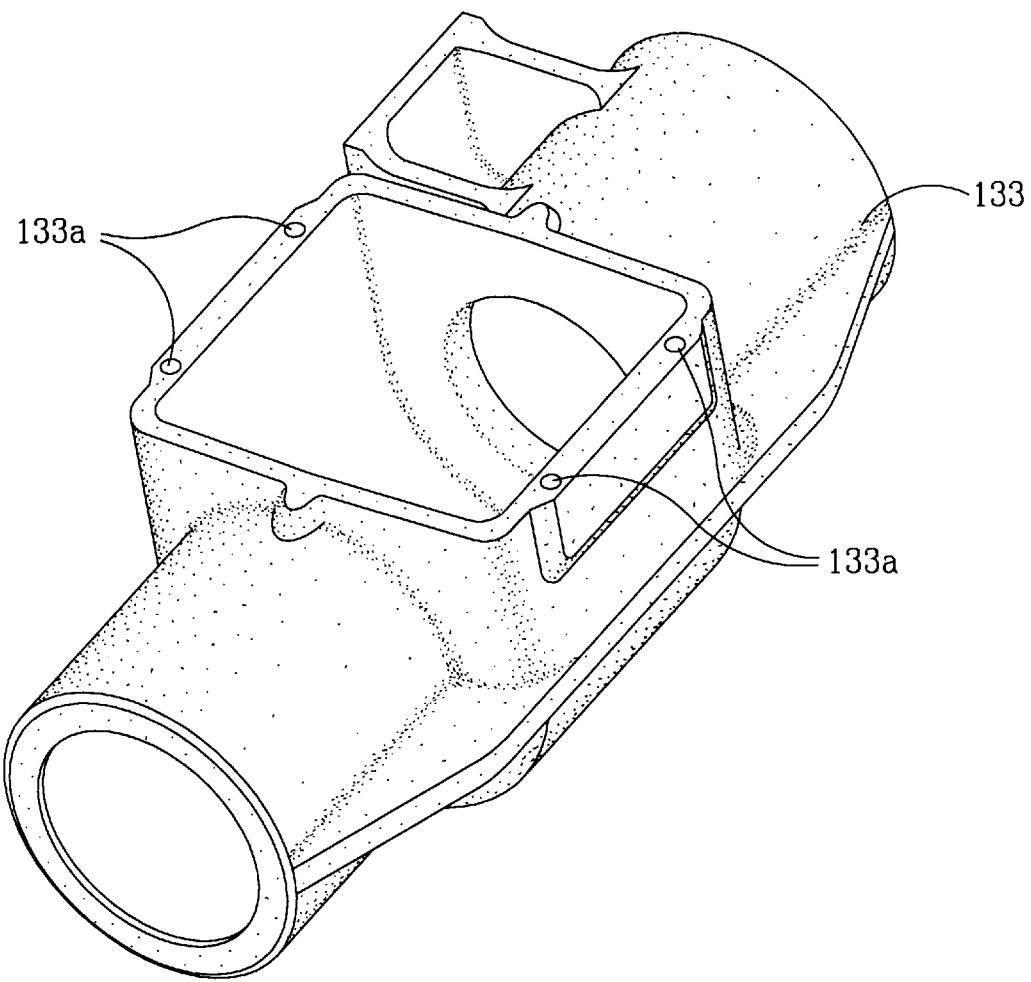
FIG. 7 is a perspective view showing the housing of this invention which receives the modular axle disconnect assembly of FIG. 6.

FIG. 7 shows the axle disconnect housing 133 which is formed to receive and protect the axle disconnect assembly 130. Bolt-receiving holes 133a may be provided to receive suitable bolts or other fastening members passing through the holes 131a of the plate 131.

Figure 8:
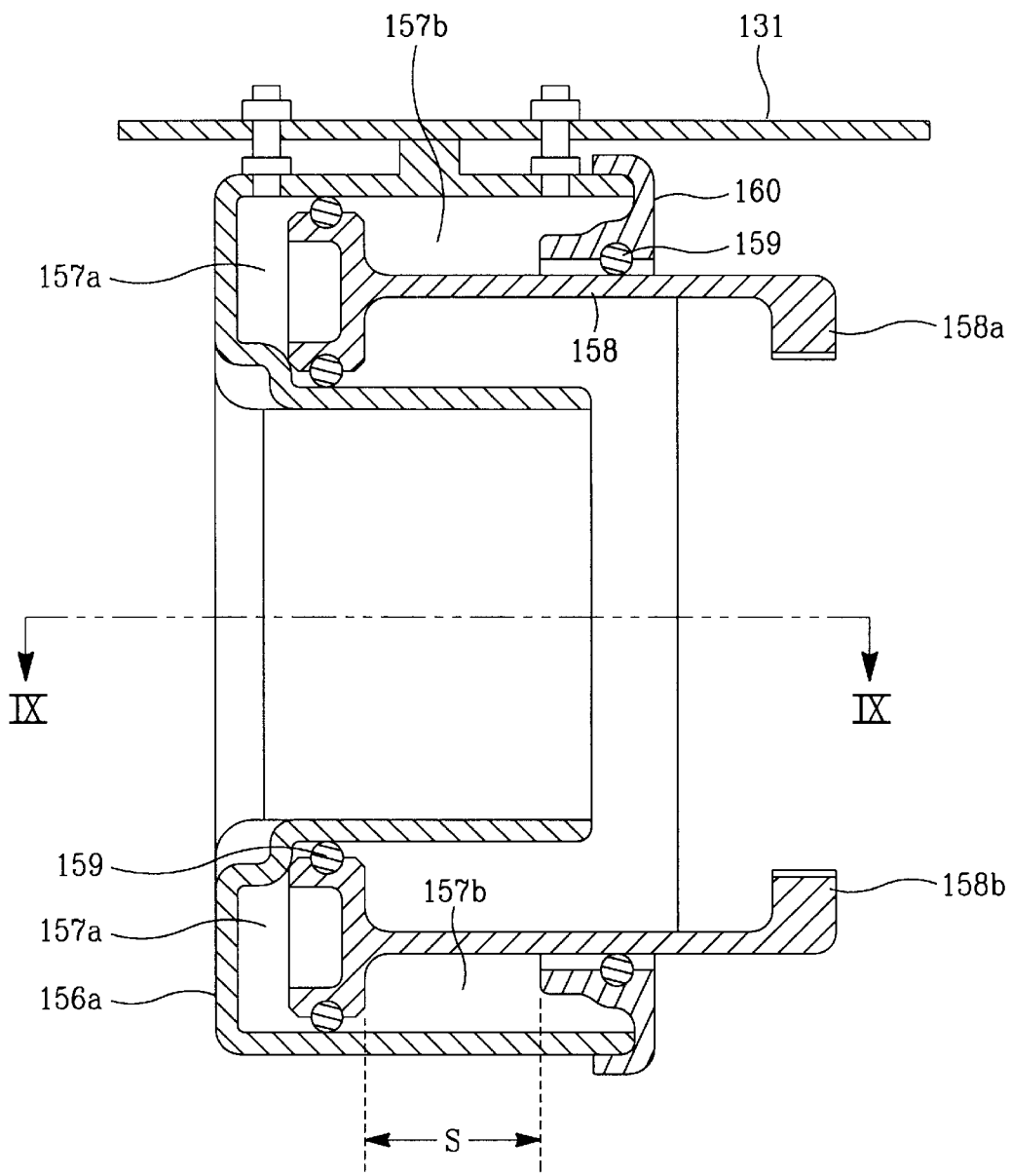
FIG. 8 is a cross sectional view of the axle disconnect assembly taken along line VIII—VIII of FIG. 6.
Figure 9:
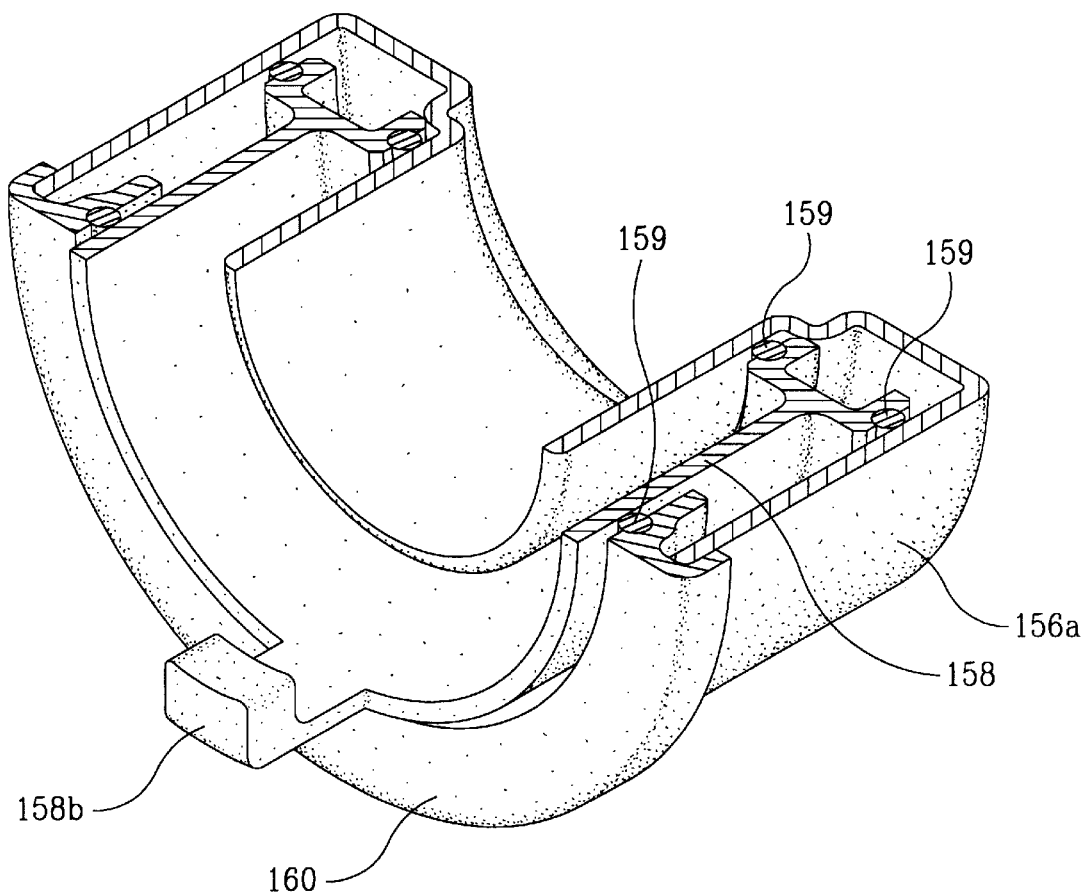
FIG. 9 is a perspective cross sectional view of the axle disconnect assembly.

FIGS. 8 and 9 provide additional illustration of the structure of the axle disconnect assembly 130 of the present invention. It should be noted that the estimated stroke 's' of the shift fork/piston 158 in the preferred embodiment is about one inch, but that value would depend directly on the exact configuration of the axle disconnect assembly. Although the present description provides specific detail regarding the location and disposition of cap member 160, ports 166a, 166b, flange body 156a, and seals 159, it will be understood that such description is not limiting in any manner, but rather, it only signifies one design embodying the spirit and scope of the present invention.

Angular orientation of the vacuum unit can be controlled through the interface between the outer lip at the connection between the two chambers 157a, 157b of the vacuum unit 156 and the disconnect casting so as to allow aligning the vents for external access.

The invention has been described in an illustrative manner, and it is to be understood that the terminology which has been used is intended to be in the nature of words of description rather than of limitation. Obviously, many modifications and variations of the present invention in light of the above teachings may be made. It is, therefore, to be understood that, within the scope of the appended claims, the invention may be practiced otherwise than as specifically described without departing from the spirit and scope of the invention.

What is claimed is:

1. An axle disconnect assembly, comprising:
   an axle housing rotatably supporting an inner axle shaft and an outer axle shaft,
   a clutch sleeve non-rotatably and translatably mounted on one of the inner and outer axle shafts, said clutch sleeve adapted to translate between a first position where clutch teeth of the clutch sleeve engage clutch teeth of said one of the inner and outer axle shafts and a second position where the clutch teeth engage both said inner and outer axle shafts,
   shift means for shifting the clutch sleeve between the first position and the second position,
   the shift means comprising a vacuum motor disposed between the axle and the axle housing and a shift fork driven by said vacuum motor, said shift fork engaging said clutch sleeve; and
   first and second vacuum input vents respectively communicating with each of said first and second chambers of said vacuum motor.

2. The axle disconnect of claim 1, wherein said vacuum motor comprises first and second chambers separated by a piston member integrally formed with said shift fork.

3. The axle disconnect of claim 2, wherein said two chambers are sealingly disposed within the axle housing.

4. The axle disconnect of claim 1, further comprising outer lips disposed at a connection between said first and second chambers, wherein an angular orientation of said vacuum unit relative to said axle housing may be controlled through an interface between said outer lips and said axle housing so as to align vents for external access.

5. The axle disconnect of claim 1, wherein said shift fork is a tubular member disposed about said inner axle shaft.

6. An axle disconnect for an auxiliary drive axle having a differential comprising:
   an axle housing rotatably supporting first and second coaxial axle shafts end-to end, the coaxial axle shafts having external clutch teeth at adjacent ends,
   a clutch sleeve rotatably and translatably disposed in the axle housing and coaxially arranged with respect to the coaxial axle shafts, the clutch sleeve having internal clutch teeth slidably engaging the external clutch teeth of at least one of the first and second axle shafts so that the clutch sleeve translates between a first position where the internal teeth engage the external teeth of the other of the inner and outer axle shafts and a second position where the internal teeth disengage the external teeth of the other of the inner and outer axle shafts, and
   shift means for shifting the clutch sleeve from the first position to the second position and vice-versa, the shift means comprising a vacuum motor coaxially arranged with respect to one of the axle shafts, said vacuum motor comprising first and second sealed chambers, and first and second vacuum ports respectively communicating with the first and second sealed chambers of the vacuum motor for connecting the vacuum motor to an external vacuum source,
   wherein the tubular clutch sleeve is translated between the first and second positions by said vacuum motor.

7. The axle disconnect of claim 6, further comprising outer lips disposed at a connection between said first and second chambers, wherein an angular orientation of said vacuum unit relative to said axle housing may be controlled through an interface between said outer lips and said axle housing so as to align said vacuum ports for external access.

8. The axle disconnect of claim 6, wherein said shift means further comprises a shift fork mounted to said vacuum motor, and wherein said shift fork and vacuum motor define a modular assembly formed to be mounted within an axle-disconnect housing as a unitary body to thereby reduce time associated with assembly and repair.

9. The axle disconnect of claim 6, wherein said first and second sealed chambers are defined by a U-shaped main body portion, said shift fork slidingly received in said U-shaped main body portion, and a cap member fitted onto an open end of said U-shaped main body member.

10. A modular axle disconnect assembly for assembly within a housing member as a unitary body, said modular assembly comprising:
   a housing plate adapted to be mounted to an axle disconnect housing;
   a vacuum motor secured to said housing plate, said vacuum motor comprising a cup-shaped main body member, a shift-fork piston assembly slidingly disposed within said cup-shaped main body member, and a cap member fittingly secured to said main body member, wherein said shift fork is a tubular member having an axle shaft passing theretrhough in an assembled state, said shift fork comprising connecting tabs adapted to engage a slot formed on a clutch sleeve;
   first and second vacuum input vents respectively communicating with each of said first and second chambers of said vacuum motor;

wherein said cap member retains a piston end of said shift-fork/piston assembly within said cup-shaped main body portion to thereby define first and second sealed chambers of said vacuum motor.

11. The modular axle disconnect assembly of claim 10, wherein, in an assembled state, said shift fork engages a clutch sleeve that is non-rotatably and translatably mounted on one of inner and outer axle shafts, said vacuum motor driving said clutch sleeve between a first position where clutch teeth of the clutch sleeve engage clutch teeth of said one of the inner and outer axle shafts and a second position where the clutch teeth engage both said inner and outer axle shafts.

12. The modular axle disconnect assembly of claim 10, further comprising first and second vacuum input vents respectively communicating with each of said first and second chambers of said vacuum motor.

13. The modular axle disconnect assembly of claim 10, further comprising at least one first seal member disposed between said piston end and said cup-shaped main body portion.

14. The modular axle disconnect assembly of claim 13, further comprising at least one second seal member disposed between said shift fork and said cap member.

* * * * *